United States Patent [19]
Sahay et al.

[11] Patent Number: 5,523,824
[45] Date of Patent: Jun. 4, 1996

[54] SWITCHABLE SELF-PROPELLED MAGNETIC BRUSH

[75] Inventors: Ravi B. Sahay; David H. Feather, both of San Diego, Calif.

[73] Assignee: Ravi & Associates, San Diego, Calif.

[21] Appl. No.: 429,321

[22] Filed: Apr. 26, 1995

[51] Int. Cl.⁶ .......................... G03G 15/01; G03G 15/09
[52] U.S. Cl. ...................... 355/251; 355/326 R; 118/658; 118/623
[58] Field of Search ...................... 355/245, 251, 355/326 R; 118/657, 658, 623

[56] References Cited

U.S. PATENT DOCUMENTS

| | | | |
|---|---|---|---|
| 2,910,963 | 11/1959 | Herman | 118/623 |
| 2,911,330 | 11/1959 | Clark | 134/1 |
| 3,040,704 | 6/1962 | Bliss | 118/658 |
| 3,611,991 | 10/1971 | Young | 118/623 |
| 4,260,239 | 4/1981 | Peperstraete | 355/251 |
| 4,465,356 | 8/1984 | Joseph et al. | 118/657 X |
| 5,210,551 | 5/1993 | Inoue et al. | 355/251 X |
| 5,243,395 | 9/1993 | Koike | 355/327 |

FOREIGN PATENT DOCUMENTS

| | | | |
|---|---|---|---|
| 58-168066 | 10/1983 | Japan. | |
| 61-166569 | 7/1986 | Japan. | |
| 2-239267 | 9/1990 | Japan | 355/251 |
| 6-161254 | 6/1994 | Japan. | |

*Primary Examiner*—Joan H. Pendegrass
*Assistant Examiner*—Sophia S. Chen
*Attorney, Agent, or Firm*—Frank G. Morkunas

[57] ABSTRACT

An electrically switchable magnetic brush for use in toner deposition or removal devices used in imaging machines of the electrostatic type. When energized by a multiphase alternating current power source or a brushless direct current power source rotatably mounted drum (9) requires no external driving force and is self-propelled.

10 Claims, 2 Drawing Sheets

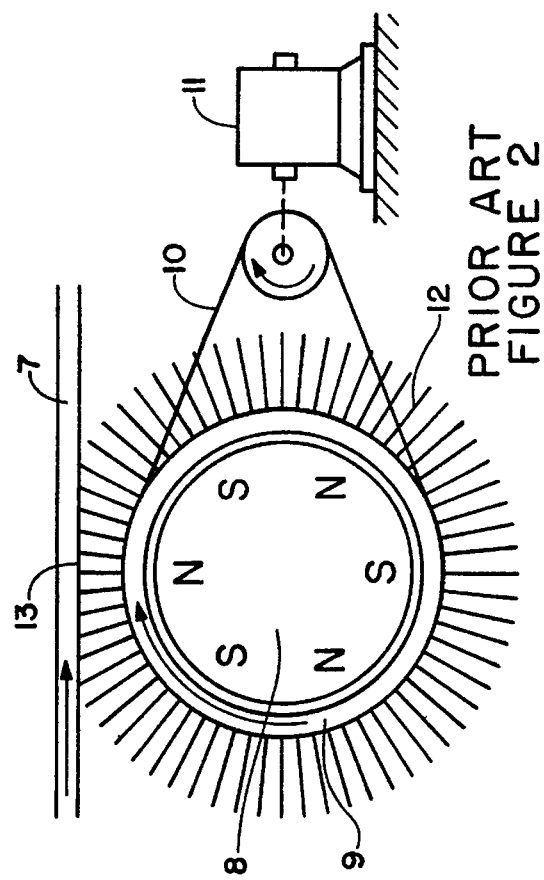
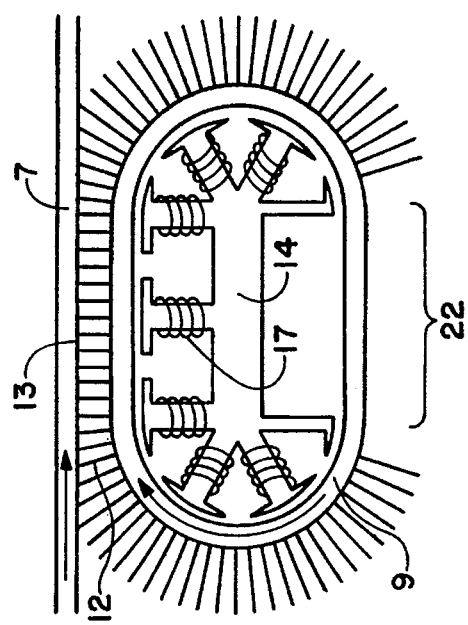
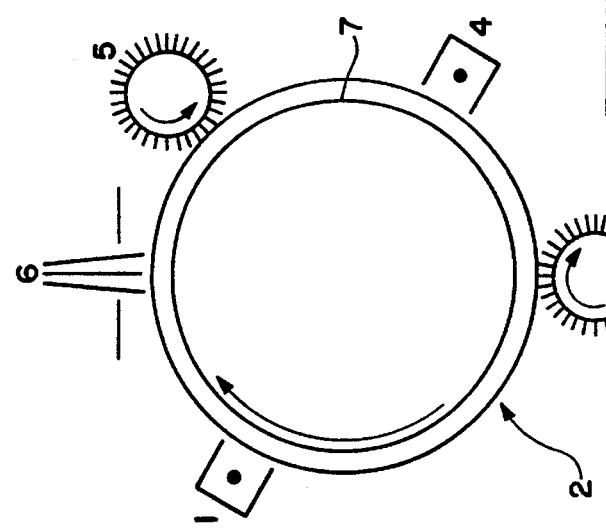
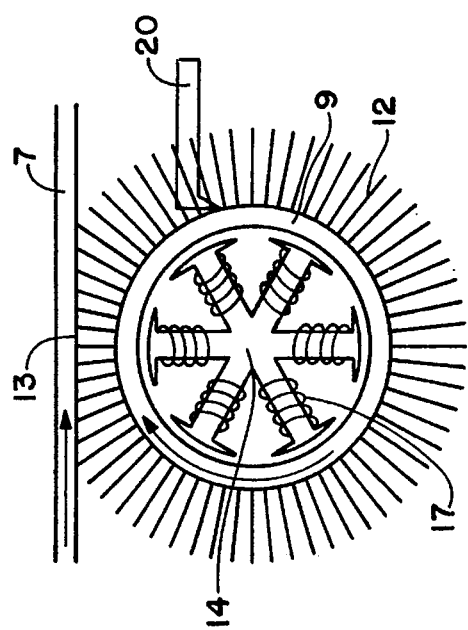

SWITCHABLE SELF-PROPELLED MAGNETIC BRUSH

BACKGROUND-FIELD OF INVENTION

This invention relates to an imaging machine of the electrostatic type, specifically to a switchable, self-propelled, magnetic brush for use in a toner deposition or removal device.

BACKGROUND-DESCRIPTION OF PRIOR ART

An imaging machine of the electrostatic type employs a photoconductor which is typically acted upon by six process steps. These steps are charge, expose, toner deposition or development, transfer, residual toner removal or cleaning and erase.

Early electrostatic imaging machines carried out the development step using a process referred to as cascade development. Cascade development eventually gave way to an improvement referred to as magnetic brush development: which has proved to be more reliable and capable of superior image quality. Magnetic brush type toner deposition devices serve to continuously attract and transport magnetic imaging material from a supply reservoir to the photoconductor and return unused or spent material to the reservoir.

Cleaning devices in imaging machines of the electrostatic type commonly employ mechanical means to remove residual toner from the surface of the photoconductor. Because mechanical means can damage the photoconductor surface, magnetic brush type cleaning is sometimes utilized.

U.S. Pat. No. 3,040,704 to Bliss, Jun. 26, 1962 and U.S. Pat. No. 2,911,330 to Clark, Nov. 3, 1959 disclose the essential elements of current magnetic brush practice. These patents disclose the use of a non-rotating, cylindrical magnetic field producing structure surrounded by a rotatable, non-magnetic drum which is driven by a suitable driving source, such as a motor of any known type.

This prior art suffers from two disadvantages:

(a) an external driving force is required to rotate the drum thereby increasing design, manufacturing and maintenance costs, and (b) the magnetic brush uses permanent magnets thereby eliminating the possibility of making dynamic changes to the magnetic field strength in the event such changes improve image quality or efficiency.

U.S. Pat. No. 4,260,239 to Peperstraete, Apr. 7, 1981 attempts a solution to these problems. Peperstraete discloses the use of a cylindrical, multipole electromagnet with either a two or more phase winding instead of a permanent magnet to generate the required magnetic field. The electromagnet is energized by a two or more phase alternating voltage power source and the drum is fixed instead of rotatable. When the electromagnet is energized, Peperstraete claims the resulting rotating magnetic field is sufficient to attract and propel toner or developer mix around the perimeter of the fixed drum.

This disclosure suffers from the following disadvantages:

(a) the disclosure depends upon relatively small circumferential magnetic field forces to overcome relatively large impeding frictional forces between the toner or developer mix and the drum surface to propel sufficient amounts of material around the perimeter of the drum, (b) the disclosure is restricted to a drum with circular geometry, and (c) the disclosure is restricted to an electromagnet energized by a multiphase alternating current power source.

Color capable imaging machines of the electrostatic type develop images using a plurality of magnetic brush type toner deposition devices. Typically, these machines possess one toner deposition device for each of four colors—cyan, magenta, yellow, and black. The machines act to sequentially deposit toner of the first color, followed by toner of the second color followed by toner of the third color, followed by toner of the fourth color. To maximize image quality, only one magnetic brush is permitted to touch the photoreceptor at any given time. This sequential imaging process is carried out by physically moving the first color magnetic brush close enough to touch the photoconductor only, followed by the second color magnetic brush only, followed by the third color magnetic brush only, followed by the fourth color magnetic brush only.

Color to color magnetic brush switching in these color capable imaging machines is accomplished by electro-mechanical mechanisms of the type described and disclosed in U.S. Pat. No. 5,243,395 to Kolke, Sep. 7, 1993. This patent describes a turret type switching mechanism and an improved carriage type switching mechanism.

Now, in the event toner reclaim was to be implemented in a color capable imaging machine of the electrostatic type using magnetic brush type cleaners, color to color switching of the cleaning magnetic brushes would similarly be required. Electro-mechanical type color switching mechanisms suffer from the following disadvantages:

(a) color switching mechanisms of the electro-mechanical type require many parts and actuators making them expensive to design, manufacture, and maintain, (b) color switching mechanisms of the electro-mechanical type are noisy, (c) color switching mechanisms of the electro-mechanical type introduce vibrational shocks into the machine which can degrade image quality, and (d) color switching mechanisms of the electro-mechanical type switch slowly necessitating a large inter-color gap on the photoconductor and lost process productivity.

SUMMARY OF THE INVENTION

The above noted problems, and others, are overcome with the improved switchable magnetic brush device which comprises a drum for carrying magnetic imaging material into proximity of a photoconductor, a magnetic brush to photoconductor contact zone in close proximity of the drum and photoconductor, two or more electromagnets within the drum which are oriented to attract magnetic imaging material to the surface of the drum and cause the material to contact the photoconductor in the magnetic brush to photoconductor contact zone when electric current is applied to the electromagnetic, a switchable power source for applying electric currents to electromagnets, and a means for removing and reclaiming unused imaging material (toner).

The improved magnetic brush device provides an economical, reliable, and versatile alternative to what is currently used. When the improved magnetic brush device is energized by an alternating current or brushless direct current power source, the brush becomes self-propelled thereby eliminating the need for an external driving force. In color applications where color to color switching is required, the invention provides this capability in an economical, reliable, noiseless, vibrationless, and rapid manner by simple electrical switching as opposed to complex electro-mechanical means.

In addition, the device need not be circular and could be fashioned by elongating the drum or by using a belt supported by two or more rollers.

While the above description contains many specificities, these should not be construed as limitations on the scope of the invention, but rather as an exemplification of several embodiments thereof. For example, the electromagnetic field strength or the frequency could be dynamically varied should this prove to be advantageous.

Accordingly, several objects and advantages of the present invention are:

(a) to eliminate the need to apply an external driving force to the drum in magnetic-brush type devices thereby decreasing design, manufacturing, and maintenance costs, (b) to provide a means for dynamically varying the magnetic field strength in magnetic brush type devices should this prove advantageous for reasons of image quality or efficiency, (c) to provide (a) and (b) above with sufficient toner or developer mix flow rates so as to be functional in an imaging machine of the electrostatic type, (d) to provide color to color switching with fewer parts and actuators and thereby reduce design, manufacturing, and maintenance costs, (e) to provide noiseless color to color switching and thereby improve customer satisfaction, (f) to provide vibrationless color to color switching and thereby improve image quality, and (g) to provide rapid color to color switching and thereby reduce the inter-color gap on the photoconductor and increase process productivity.

Further objects and advantages of the present invention are to enable non-circular magnetic brush configurations to extend the length of the magnetic brush to photoconductor contact zone and thereby avoid the need for a plurality of circular drums. Still further objects and advantages will become apparent from a consideration of the ensuing description and drawings.

BRIEF DESCRIPTION OF THE DRAWINGS

FIG. 1 shows an end view of the electrostatic type imaging process.

FIG. 2 shows an end view of various aspects of current magnetic brush practice.

FIG. 3A shows an end view of various aspects of one embodiment of the magnetic brush invention with the power source switched on.

FIG. 3B shows a non-circular configuration of the magnetic brush invention with power source on.

DESCRIPTION OF THE PREFERRED EMBODIMENT(S)

Figure 7:
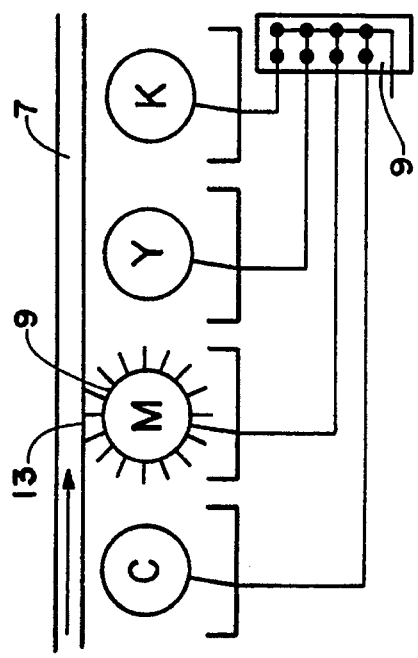
FIG. 7 shows an end view of a: color electrostatic imager using the present invention to accomplish color switching.

As FIG. 1 shows, the electrostatic imaging process typically involves six process steps. Charge 1 first uniformly charges the surface of moving photoconductor 7. At expose 2, a light source is directed at the photoconductor to selectively erase areas of surface charge and create a latent electrostatic image. At magnetic brush development 3, toner is attracted from a magnetic brush to the surface of moving photoconductor 7 by electrostatic forces. At transfer 4, toner is transferred from moving photoconductor 7 to paper. At magnetic brush cleaning 5, residual toner is attracted from the surface of moving photoconductor 7 to a magnetic brush. Finally, at erase 6, moving photoconductor 7 is flooded with light to eliminate the latent electrostatic image prior to the start of the next imaging cycle.

In a typical magnetic brush embodiment (see FIG. 2), an external driving force is applied to rotate rotatably mounted drum 9. Stationary multipole permanent magnet 8 attracts magnetic toner or developer mix to the surface of rotatably mounted drum 9 and establishes a magnetic brush 12 on the surface of the drum. Due to friction between magnetic brush 12 and the surface of rotatably mounted drum 9 and the rotation of rotatably mounted drum 9, magnetic imaging material is transported into magnetic brush to photoconductor contact zone 13. Electrostatic forces present in magnetic brush to photoconductor contact zone 13 act to deposit toner on or remove toner from moving photoconductor 7.

Figure 4:
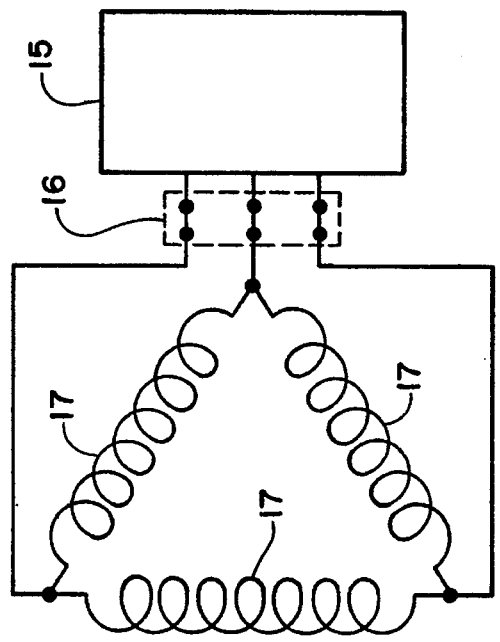
FIG. 4 shows a switchably controlled power source.

In one embodiment of the present magnetic brush invention (see FIG. 3), stationary multipole electromagnet 14 is energized by the switchably controlled power source shown in FIG. 4. In this embodiment, power source 15 is a multiphase alternating current power supply which generates a rotating magnetic field in stationary multipole electromagnet 14. The rotating magnetic field attracts magnetic imaging material to the surface of drum 9 and establishes a magnetic brush 12. Drum 9 could be a rotatable drum or tube-like structure, a fixed drum or tube-like structure, or an elongated drum (fixed or rotatable) or elongated tube-like structure (fixed or rotatable). Unless specifically referred to otherwise, in the following descriptions drum 9 will be a rotatably mounted drum. Simultaneously, the rotating magnetic field induces magnetic forces in rotatably mounted drum 9 which cause it to self rotate and follow the rotating magnetic field. The electro-magnetic field strength could be dynamically varied as could the electro-magnetic frequency. Such variances permit full to partial to no magnetic brush development 22 (as shown in FIG. 3B) along any section of drum 9. Such variances also permit reversal 5 of the magnetic brush rotation as shown in FIG. 1. Due to friction between magnetic brush 12 and the surface of rotatably mounted drum 9 and the self rotation of rotatably mounted drum 9, magnetic imaging material is transported into magnetic brush to photoconductor contact zone 13. Electrostatic forces present in magnetic brush to photoconductor contact zone 13 act to deposit toner on or remove toner from moving photoconductor 7. Means for removing and reclaiming toner (toner removal means) may be any conventional means, any mechanical means, or by at least one magnetic brush cleaning 5 positioned passed transfer 4 as shown in FIG. 1. In this regard, and referring to FIGS. 1 and 3, as but one example, removing (or cleaning) toner from rotating photoconductor 7 is accomplished by passing magnetic brush 12 over the surface of rotating photoconductor 7 whereby magnetic brush 12, by magnetic attraction, removes (cleans) toner from the surface of rotating photoconductor 7 at magnetic brush to photoconductor contact zone 13. Use of a mechanical removal means usually also entails Use of permanent magnets rather than electromagnets and involves any mechanical means such as scraper 20. After removal of unused toner from photoconductor 7, unused toner is deposited in suitable reservoirs.

Figure 5:
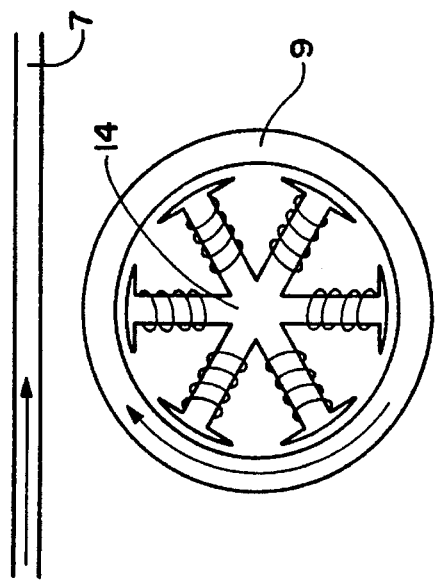
FIG. 5 shows an end view of various aspects of one embodiment of the magnetic brush invention with the power source switched off.

FIG. 5 shows an end view of this embodiment when switch 16 in FIG. 4 is open or switched off. In this condition, self rotation of rotatably mounted drum 9 ceases, magnetic brush 12 collapses and magnetic brush to photoconductor contact zone 13 is eliminated.

Figure 6:
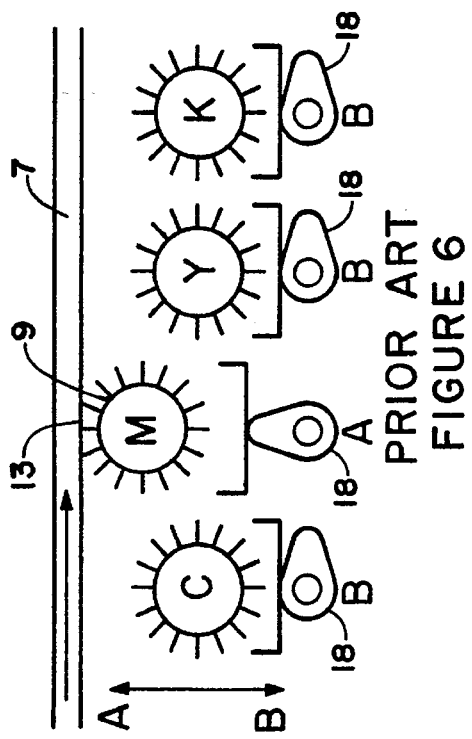
FIG. 6 shows an end view of a color electrostatic imager using electro-mechanical means to accomplish color switching.

Color to color switching is required in color imaging machines of the electrostatic type to minimize image degradation or reclaim color toner by engaging removal means suited for the intended purpose. Color to color switching is accomplished in current practice by sequentially creating magnetic brush to photoconductor contact zone 13 for each color one at a time FIG. 6 shows a typical embodiment of current practice wherein electro-mechanical actuators 18 are employed to increase (movement in direction A) or decrease (movement in direction B) the spacing between rotatably mounted drums 9 and moving photoconductor 7 thereby creating magnetic brush to photoconductor contact zone 13 one at a time to achieve this result.

FIG. 7 shows how this switching process is accomplished with this embodiment of the present invention. As FIG. 7 shows, color to color switching is achieved by using switch 19 to sequentially energize stationary multipole electromagnet 14 for each color one at a time. Consequently, this embodiment of the present: invention simultaneously eliminates the need for an external driving force to propel rotatably mounted drum 9 and enables color to color switching by simple power supply switching as opposed to complex electro-mechanical means.

In a second embodiment of the present invention, power source 15 is a brushless direct current power supply.

In a third embodiment of the present invention, power source 15 is a direct current power supply and rotatably mounted drum 9 is propelled by an external driving force. In this embodiment, color to color switching is achieved by using switch 19 to sequentially energize stationary multipole electromagnet 14 for each color one at a time.

In a fourth embodiment of the present invention, rotatably mounted drum 9 is replaced by a fixed drum. In this embodiment, color to color switching is achieved by using switch 19 to sequentially energize stationary multipole electromagnet 14 for each color one at a time.

In a fifth embodiment of the present invention, rotatably mounted drum 9 is replaced by a belt supported by two or more rollers to illustrate extensibility to non-circular geometries.

The self-propelling nature as described in the embodiments above for a rotatably drum may also be replaced by use of any suitable conventional mechanical means as shown in FIG. 2.

The above-noted problems, among others, are overcome by the present invention. The improved magnetic brush device of this invention provides an economical, reliable, and versatile alternative to current practice. When the device is energized by an alternating current or brushless direct current power source, the brush is self-propelled thereby eliminating the need for an external driving force. In color applications where color to color switching is required, the invention provides this capability in an economical, reliable, noiseless, vibrationless, and rapid manner by simple electrical switching as opposed to complex electro-mechanical means. In addition, the device need not be circular and could be self-propelled or mechanically propelled and be constructed using a belt supported by two or more rollers.

While the above description contains many specificities, these should not be construed as limitations on the scope of the invention, but rather as an exemplification of several embodiments thereof. For example, the electromagnetic field strength or the frequency could be dynamically varied should this prove to be advantageous.

Accordingly, the scope of the invention should be determined not by the embodiments illustrated, but by the appended claims and their legal equivalents.

We claim:

1. An improved switchable magnetic brush toner deposition or removal device for an imaging machine of the electrostatic type, wherein the improvement comprises:

(a) a drum for carrying magnetic imaging material into proximity of a photoconductor wherein said drum is mounted parallel to the plane of said photoconductor;

(b) a magnetic brush to photoconductor contact zone at the region of closest proximity between said carrier means and said photoconductor;

(c) two or more electromagnets within said drum, said electromagnets comprising a stationary multi-pole electromagnet, and oriented to attract magnetic imaging material to the surface of said drum and cause said magnetic imaging material to contact said photoconductor in said magnetic brush to photoconductor contact zone when electric current is applied to said electromagnets;

(d) zero to more permanent magnets within said drum; and (e) a switchably controlled power source for applying said electric currents to said electromagnets, said power source comprising a multiphase alternating current source controlled to produce a rotating magnetic field of sufficient, selective, and varying strength to cause a propelling-like movement of said drum and thereby rotatably transport attracted said magnetic imaging material through said magnetic brush to said photoconductor contact zone and further to cause the touching of said photoconductor by said magnetic imaging material in said magnetic brush to said photoconductor contact zone when current is switched on and the absence of touching therebetween when current is switched off.

2. The device of claim 1 wherein said drum comprises a fixed tube and said rotating magnetic field is sufficient to attract and transport said imaging material through said magnetic brush to photoconductor contact zone.

3. The device of claim 1 wherein said drum is non-circular.

4. The device of claim 1 wherein said drum comprises a rotatably mounted drum and said rotating magnetic field is sufficient to cause said rotatably mounted drum to self-propel and to attract and transport said imaging material through said magnetic brush to said photoconductor contact zone electric current is applied to said electromagnets.

5. The device of claim 4 wherein said rotatably mounted drum is driven by an external means.

6. An improved switchable magnetic brush toner deposition or removal device for an imaging machine of the electrostatic type, wherein the improvement comprises:

(a) a drum for carrying magnetic imaging material into proximity of a photoconductor wherein said drum is mounted parallel to the plane of said photoconductor;

(b) a magnetic brush to photoconductor contact zone at the region of closest proximity between said carrier means and said photoconductor;

(c) two or more electromagnets within said drum, said electromagnets comprising a stationary multi-pole electromagnet, and oriented to attract magnetic imaging material to the surface of said drum and cause said magnetic imaging material to contact said photoconductor in said magnetic brush to photoconductor contact zone when electric current is applied to said electromagnet;

(d) zero to more permanent magnets within said drum; and (e) a switchably controlled power source for applying said electric currents to said electromagnets, said power source comprising a brushless direct current source controlled to produce a rotating magnetic field of sufficient, selective, and varying strength to cause a propelling-like movement of said drum and thereby rotatably transport attracted said magnetic imaging material through said magnetic brush to said photoconductor contact zone and further to cause the touching of said photoconductor by said magnetic imaging material in said magnetic brush to said photoconductor contact zone when current is switched on and the absence of touching therebetween when current is switched off.

7. The device of claim 6 wherein said drum comprises a fixed tube and said rotating magnetic field is sufficient to attract and transport said imaging material through said magnetic brush to said photoconductor contact zone.

8. The device of claim 6 wherein said drum comprises a rotatably mounted drum and said rotating magnetic field is sufficient to cause said rotatably mounted drum to self-propel and to attract and transport said imaging material through said magnetic brush to said photoconductor contact zone electric current is applied to said electromagnets.

9. The device of claim 8 wherein said rotatably mounted drum is driven by an external means.

10. The device of claim 6 wherein said drum is non-circular.

* * * * *